US011242097B1

(12) United States Patent
Gross, IV et al.

(10) Patent No.: US 11,242,097 B1
(45) Date of Patent: Feb. 8, 2022

(54) AUDIO SYSTEM FOR TAILGATE

(71) Applicant: Stillwater Designs and Audio, Inc., Stillwater, OK (US)

(72) Inventors: Joseph C. Gross, IV, Sand Springs, OK (US); Martin N. Williams, Stillwater, OK (US); John D. Cronin, Guthrie, OK (US); Dennis A. Hotson, Stillwater, OK (US); Joshua N. James, Stilwater, OK (US); Garry L. Roberts, Stillwater, OK (US); Charles Wesley Groh, Stillwater, OK (US)

(73) Assignee: Stillwater Designs and Audio, Inc., Stillwater, OK (US)

( * ) Notice: Subject to any disclaimer, the term of this patent is extended or adjusted under 35 U.S.C. 154(b) by 0 days.

(21) Appl. No.: 17/079,814

(22) Filed: Oct. 26, 2020

Related U.S. Application Data

(60) Provisional application No. 62/927,014, filed on Oct. 28, 2019.

(51) Int. Cl.
*B62D 33/027* (2006.01)
*H04R 1/02* (2006.01)
*H04R 5/02* (2006.01)

(52) U.S. Cl.
CPC ........... *B62D 33/027* (2013.01); *H04R 1/025* (2013.01); *H04R 5/02* (2013.01); *H04R 2499/13* (2013.01)

(58) Field of Classification Search
CPC ...... H04R 1/025; H04R 5/02; H04R 2499/13; B62D 33/027
See application file for complete search history.

(56) References Cited

U.S. PATENT DOCUMENTS

| D305,333 | S | 1/1990 | Irby |
| D307,015 | S | 4/1990 | Irby |
| 5,215,346 | A * | 6/1993 | Reitzloff ............ B62D 33/0273 |
| | | | 296/37.6 |
| D355,193 | S | 2/1995 | Irby |
| D449,293 | S | 10/2001 | Irby et al. |
| D456,386 | S | 4/2002 | Irby et al. |
| D473,216 | S | 4/2003 | Irby et al. |
| 6,611,604 | B1 | 8/2003 | Irby et al. |
| 6,731,773 | B1 | 5/2004 | Bergbower et al. |
| 6,968,069 | B1 | 11/2005 | Zhao |

(Continued)

FOREIGN PATENT DOCUMENTS

| AU | 773216 B2 | 9/2004 |
| AU | 2004205159 | 8/2006 |

(Continued)

*Primary Examiner* — Jason R Kurr
(74) *Attorney, Agent, or Firm* — Mary M. Lee

(57) ABSTRACT

An audio system for installation in the tailgate of a pickup truck. A rugged, weather-resistant audio system is installed in a fold-down section of a multi-part tailgate. The system may operate independently of the sound system in the vehicle; the truck does not need to be running for the system to function. A low current draw allows the system to play for hours. The system may include a control that automatically powers off the system when the tailgate is returned to the closed position. The system may incorporate a USB port for device charging and flash memory playback, along with full Bluetooth streaming compatibility.

14 Claims, 9 Drawing Sheets

(56) References Cited

U.S. PATENT DOCUMENTS

| | | | |
|---|---|---|---|
| 7,483,539 B2 * | 1/2009 | Stark | H04B 1/082 |
| | | | 381/123 |
| 7,916,890 B2 | 3/2011 | Irby et al. | |
| 8,023,688 B2 | 9/2011 | Irby et al. | |
| 8,237,557 B1 * | 8/2012 | Hertz | B60R 3/02 |
| | | | 340/468 |
| 9,463,746 B2 | 10/2016 | Butlin, Jr. et al. | |
| 9,540,051 B2 * | 1/2017 | Bauer | B60J 5/108 |
| D783,577 S | 4/2017 | Ambrose et al. | |
| D798,837 S | 10/2017 | Surratt et al. | |
| D807,326 S | 1/2018 | Justis | |
| D820,815 S | 6/2018 | Justis | |
| D852,781 S | 7/2019 | Hotson et al. | |
| 10,608,596 B1 | 3/2020 | Pires | |
| 10,609,505 B1 | 3/2020 | Pires et al. | |
| D917,418 S | 4/2021 | Irby et al. | |
| 10,979,847 B1 | 4/2021 | Pires et al. | |
| 11,044,541 B1 | 6/2021 | Ambrose et al. | |
| 11,072,298 B1 | 7/2021 | Pires | |
| 2003/0194104 A1 | 10/2003 | Irby et al. | |
| 2007/0080264 A1 * | 4/2007 | Kukucka | H04R 5/02 |
| | | | 248/27.1 |
| 2008/0075318 A1 | 3/2008 | Zhao | |
| 2008/0118098 A1 | 5/2008 | Irby et al. | |

FOREIGN PATENT DOCUMENTS

| | | |
|---|---|---|
| CA | 2387939 | 9/2006 |
| CN | 101257733 | 8/2012 |
| EP | 1222839 | 7/2012 |
| ID | 018046 | 9/2006 |
| KR | 554818 | 2/2006 |
| MX | 227315 | 4/2005 |
| MY | 125083 | 7/2006 |
| SG | 87643 | 5/2005 |
| TH | 048559 | 3/2016 |
| TW | 498700 | 12/2002 |
| WO | 0131975 A2 | 5/2001 |

* cited by examiner

AUDIO SYSTEM FOR TAILGATE

CROSS-REFERENCE TO RELATED APPLICATIONS

This application claims the benefit of U.S. provisional application No. 62/927,014 entitled "Audio System for Tailgate," filed Oct. 28, 2019, the contents of which are incorporated herein by reference.

FIELD OF THE INVENTION

The present invention relates generally to audio systems, and more particularly, but without limitation to audio systems for vehicles.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate preferred embodiments of the invention and are not to be construed as limiting the scope of the invention.

DETAILED DESCRIPTION OF THE PREFERRED EMBODIMENT(S)

If you're setting up a campsite or tailgating at the big game, and want to bring your music outdoors and closer to you—but don't want to leave your truck running in order to play the stereo—the present invention provides the solution. The present invention provides a sound system that installs in the tailgate of your pickup truck and turns the pickup's bed into an outdoor concert.

Figure 1:
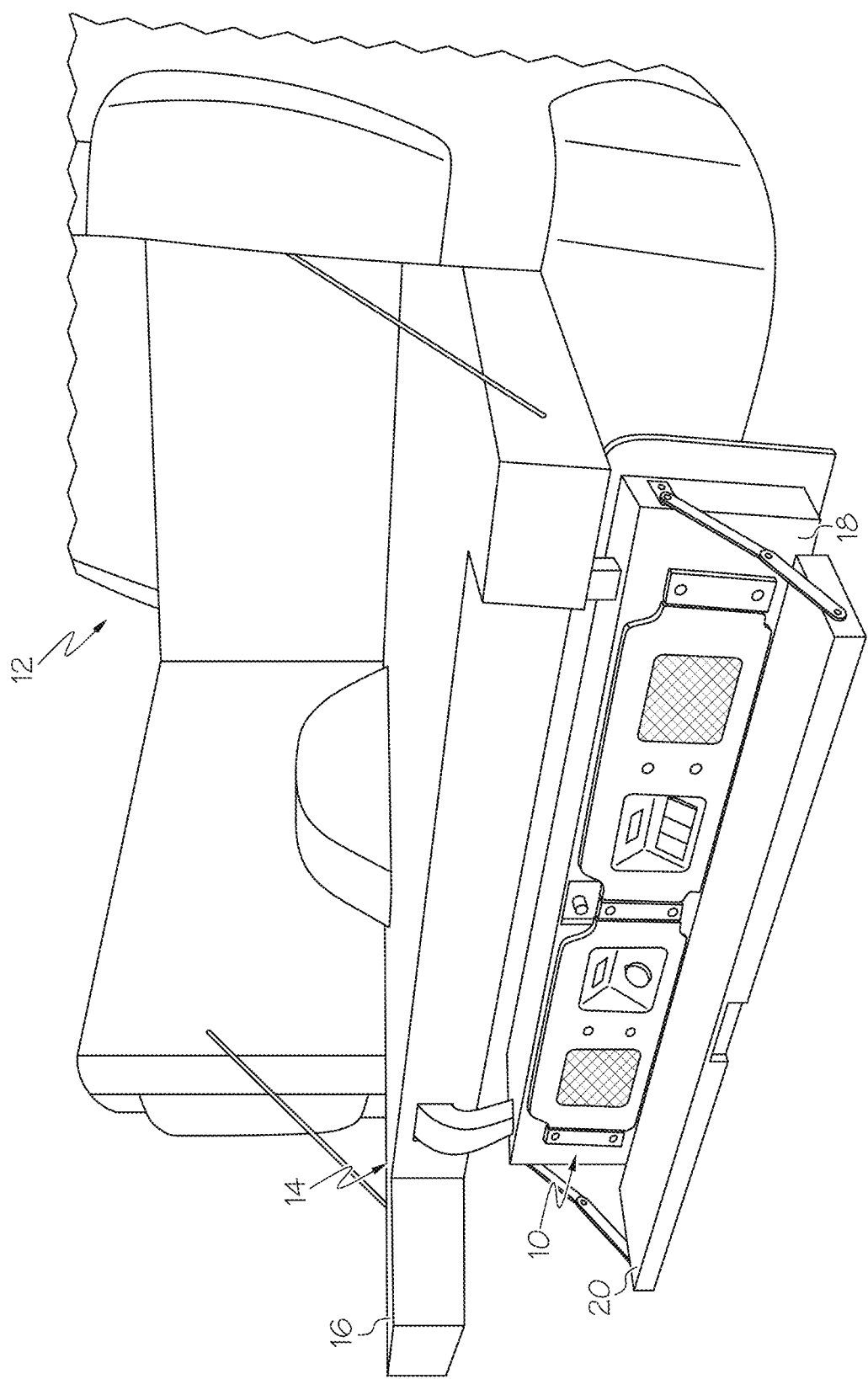
FIG. 1 is a rear perspective view of a pickup truck having installed therein an audio system made in accordance with an embodiment of the present invention. The primary tailgate is open to the horizontal position, the inner tailgate is open to the down or vertical position, and the step panel is open to expose the audio system installed in the inner tailgate behind the step panel.

Turning now to the drawings in general and to FIG. 1 in particular, there is shown therein an audio system made in accordance with an embodiment of the present invention and designated generally by the reference number 10. The embodiment shown herein is designed for the GMC Sierra 1500 model pickup truck equipped with the "MultiPro" tailgate, but the invention is not so limited.

Figure 3:
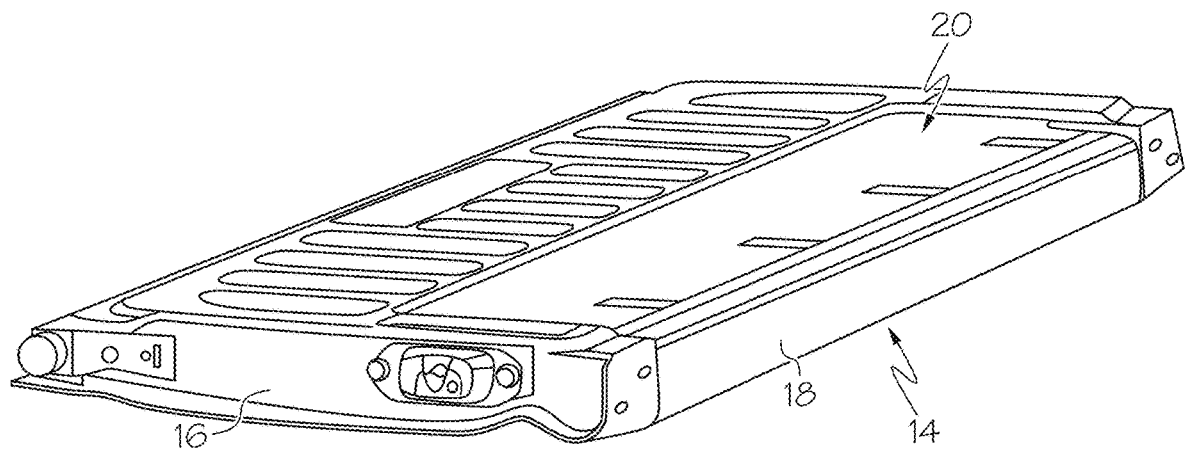
FIG. 3 shows the primary tailgate in the open (horizontal) position and inner tailgate closed (horizontal).
Figure 4:
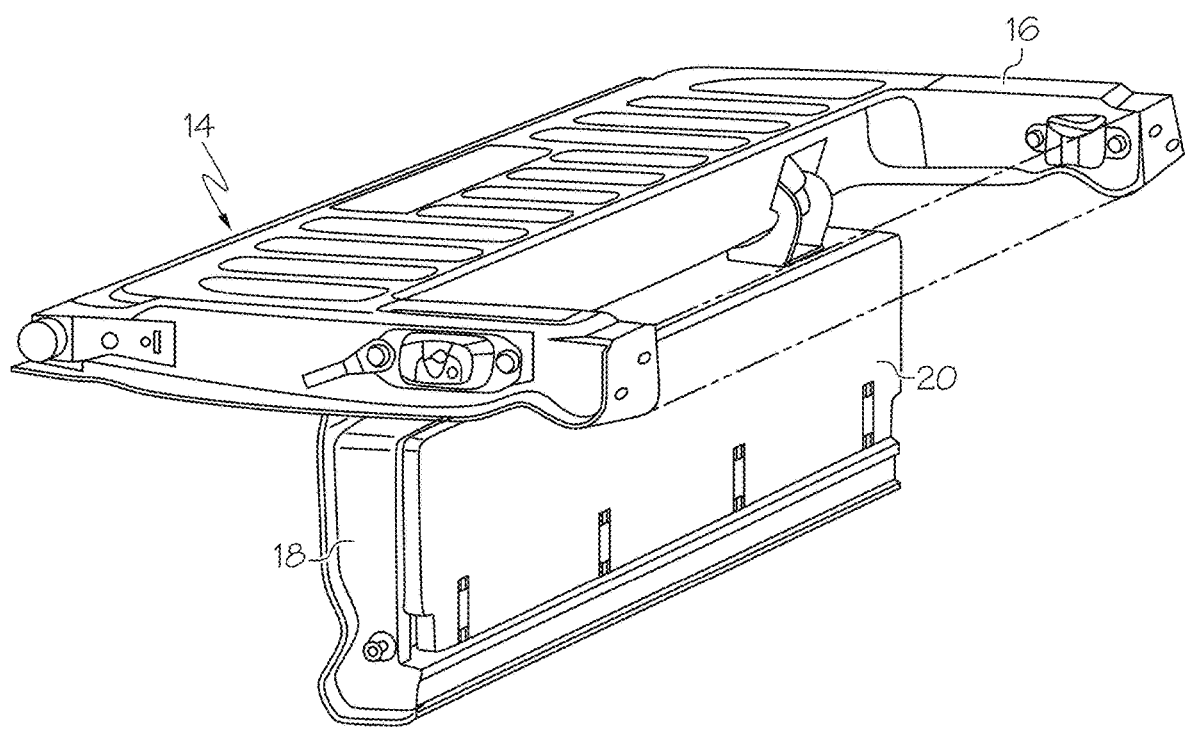
FIG. 4 shows the primary tailgate in the open (horizontal) position with the inner tailgate open (vertical) and the step panel closed.

The GMC Sierra truck illustrated in FIG. 1, designated generally at 12, offers a multi-part tailgate 14 with a primary tailgate 16 that is pivotally attached to the back edge of the bed of the truck and secondary or inner tailgate 18 that folds down out from the primary tailgate. The primary tailgate 16 is movable between a vertical closed position (FIG. 2) and a horizontal open position, seen in FIG. 3. The inner tailgate 18 is movable between a closed horizontal position when the primary tailgate is in the open horizontal position (FIG. 3) and an open vertical position depending from the primary tailgate 16 when the primary tailgate is in the open horizontal position, as illustrated in FIG. 4. A complete description of this tailgate is provided in U.S. Pat. No. 9,463,746 entitled "Multi-Panel Hinged Endgate Assembly with Edge Support for Step Panel," issued Oct. 11, 2016, and incorporated herein by reference.

In FIG. 4, a step panel 20 is shown in the vertical or closed position folded up over the deployed inner tailgate 18 hanging in vertical open position. The step panel 20 also is movable between a closed vertical position when the inner tailgate is in the open vertical position (FIG. 4) and an open position exposing the front of the inside of the inner tailgate 18, as shown in FIG. 1. Now it will be seen that the audio system of this invention in integrated into the inner tailgate 18 so that it is covered by the step panel 20 when the step panel is in the closed position (FIG. 4).

Figure 5:
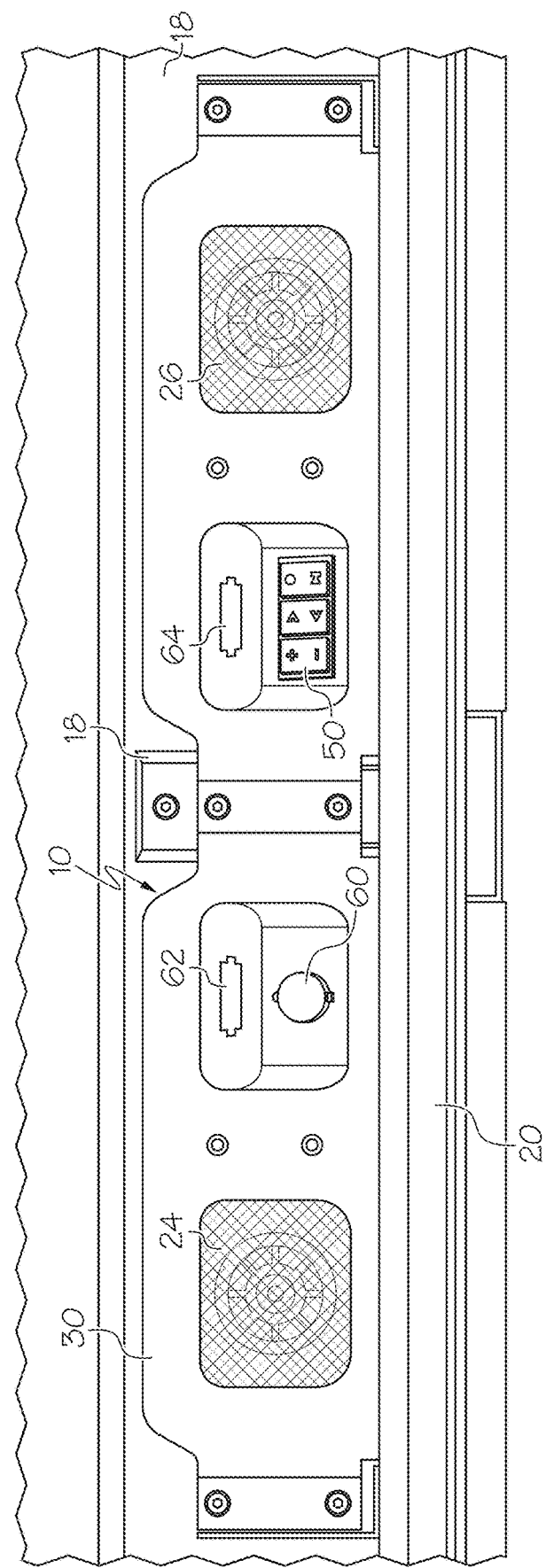
FIG. 5 is rear elevational view of the inner tailgate and the audio system installed therein.

The system 10 may be installed in the tailgate 14 at the factory as original equipment. Alternately, the system may be provided in the form of a kit for sale and installation by the dealer or purchaser. The components and configuration of a kit may vary. FIGS. 1 and 5 illustrate an audio system 10 that may be provided originally as a kit. The components of the exemplary kit, designated generally at 22, are shown in FIG. 6.

Figure 6:
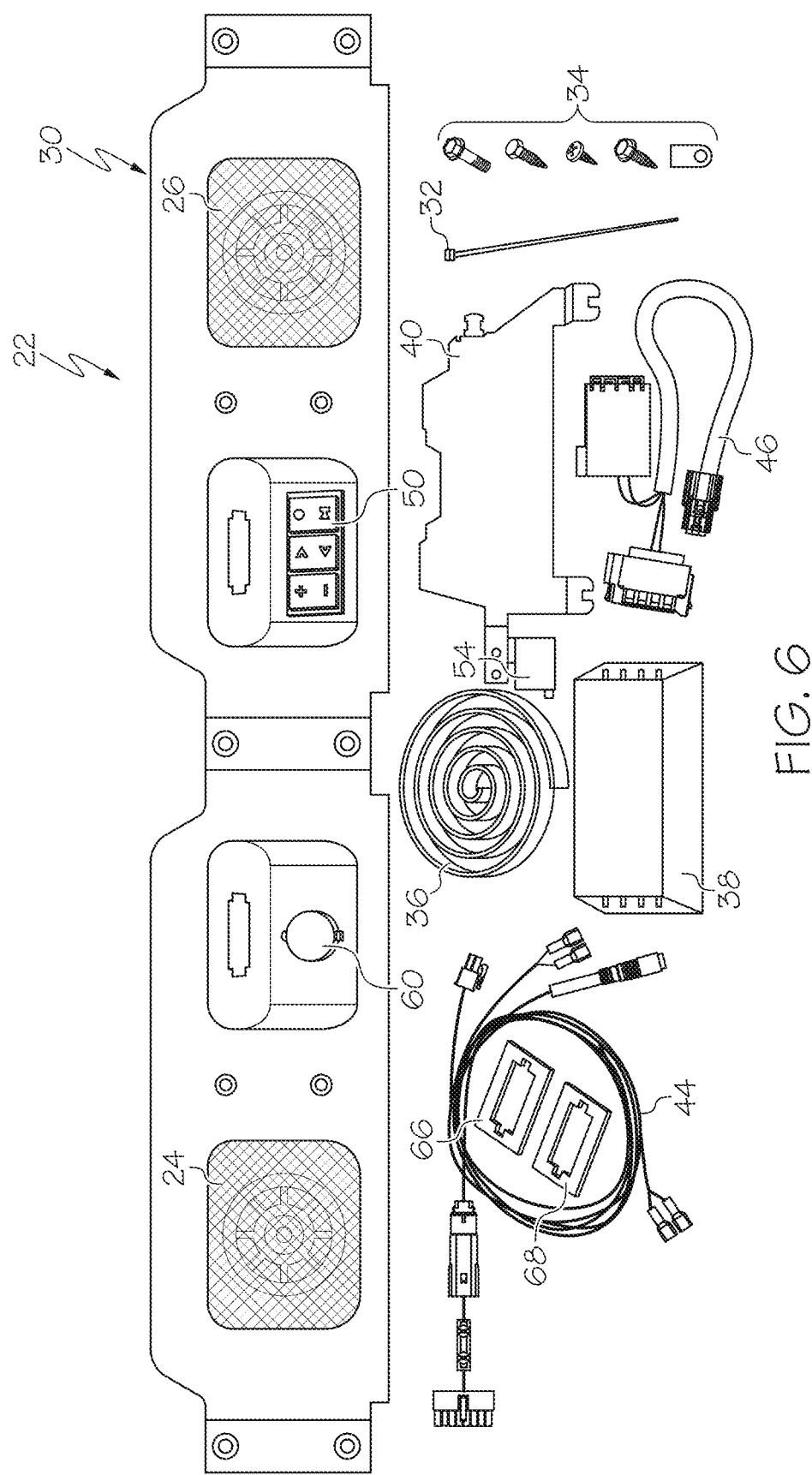
FIG. 6 shows the components of a kit for installing the inventive audio system into a tailgate.

With continuing reference to FIGS. 5 and 6, the main components of the audio system 10 and kit 22 will be described. The system 10 comprises at least one loudspeaker. As shown, the system 10 may comprise two speakers 24 and 26. In the illustrative embodiment, the loudspeakers are two 4-inch coaxial drivers, such as a Kicker® brand 40PS42 speakers. These speakers 24 and 26 are configured for installation in the tailgate 14. To that end, the speakers 24 and 26 may be mounted in opposite ends of a baffle plate or mounting panel 30. However, the number, size, frequency range, arrangement, and position of the loudspeakers in the system 10 may vary.

The size and configuration of the panel 30 likewise may vary. As indicated, the exemplary system 10 and kit 22 are customized to the GMC Sierra 1500 truck equipped with the "MultiPro" tailgate. However, the panel 30 may be customized to any specific vehicle so that it mounts to existing mounting points on the tailgate. Similarly, as shown in FIG. 6, the custom installation kit may include wire ties 32 and hardware 34 specific to the vehicle model. The mounting panel 30 may be formed of ABS (acrylonitrile butadiene styrene) or other suitable material. It will be appreciated that the mounting panel 30, as well as the other components of the system 10 and kit 22 should be made to withstand the impacts of a moving vehicle (particularly a pickup truck) as well as the effects of weather, such as rain, wind, blowing dirt and debris, and extreme temperatures. For example, in the kit illustrated, foam tape 36 (FIG. 6) may be included so that, when installed, the mounting plate 30 is fully gasketed.

Figure 7:
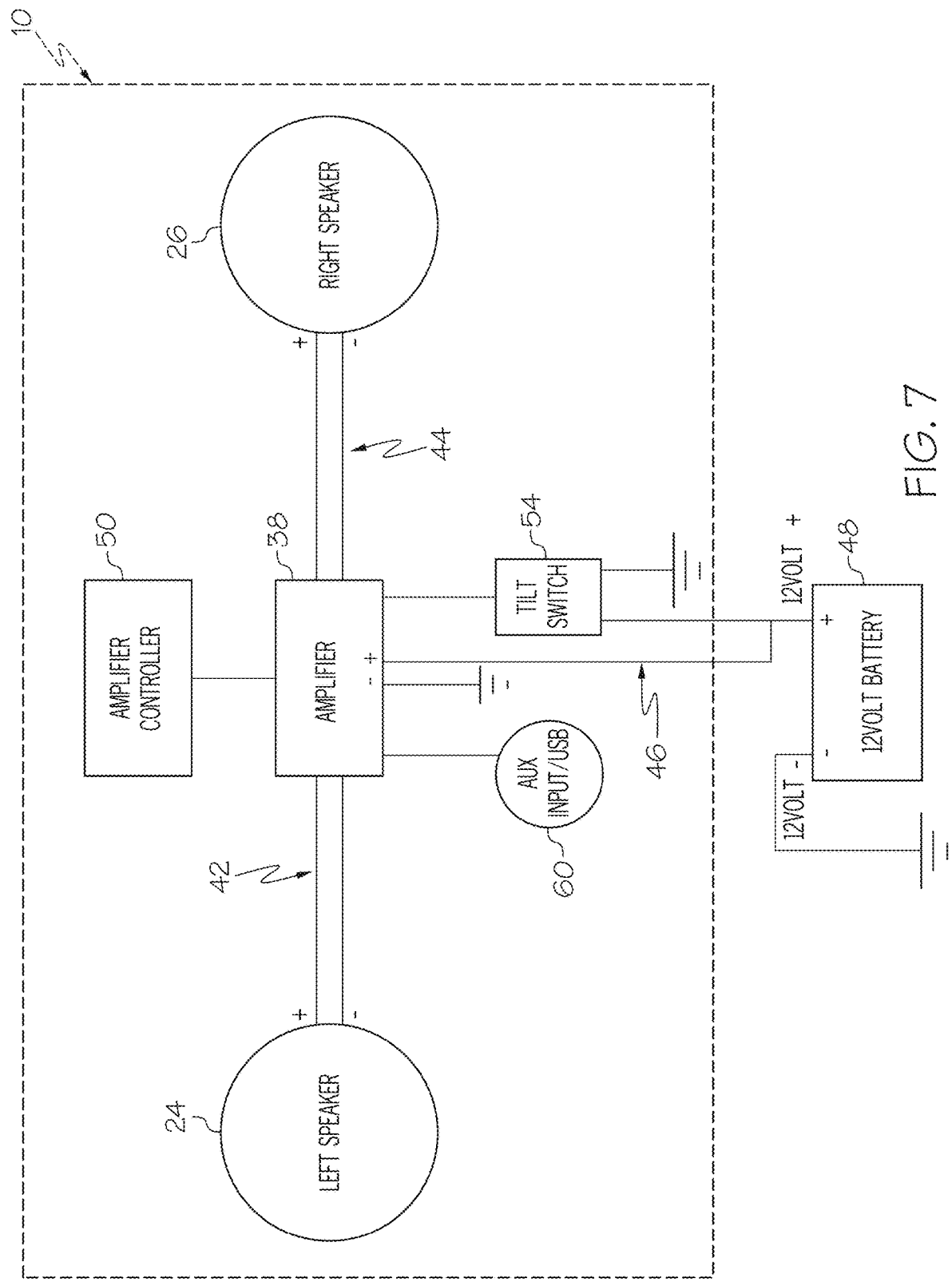
FIG. 7 is a wiring schematic of the audio system showing how the controller and tilt switch connect with the vehicle battery as the power source.

With continued reference to FIG. 5 and now also to FIGS. 6 and 7, the system 10 may further comprise an amplifier 38 (FIGS. 6&7). The amplifier 38 may be installed in the inner tailgate 18 behind the mounting panel 30. In the exemplary kit 22, the amplifier 38 is a rugged, waterproof compact amplifier, but the type of amplifier may vary. The amplifier 38 is electrically connectable to the loudspeakers 24 and 26. An amplifier bracket 40 (FIG. 6) may be included to securely mount the amplifier 38 to the inner tailgate behind the mounting panel 30.

Figure 8:
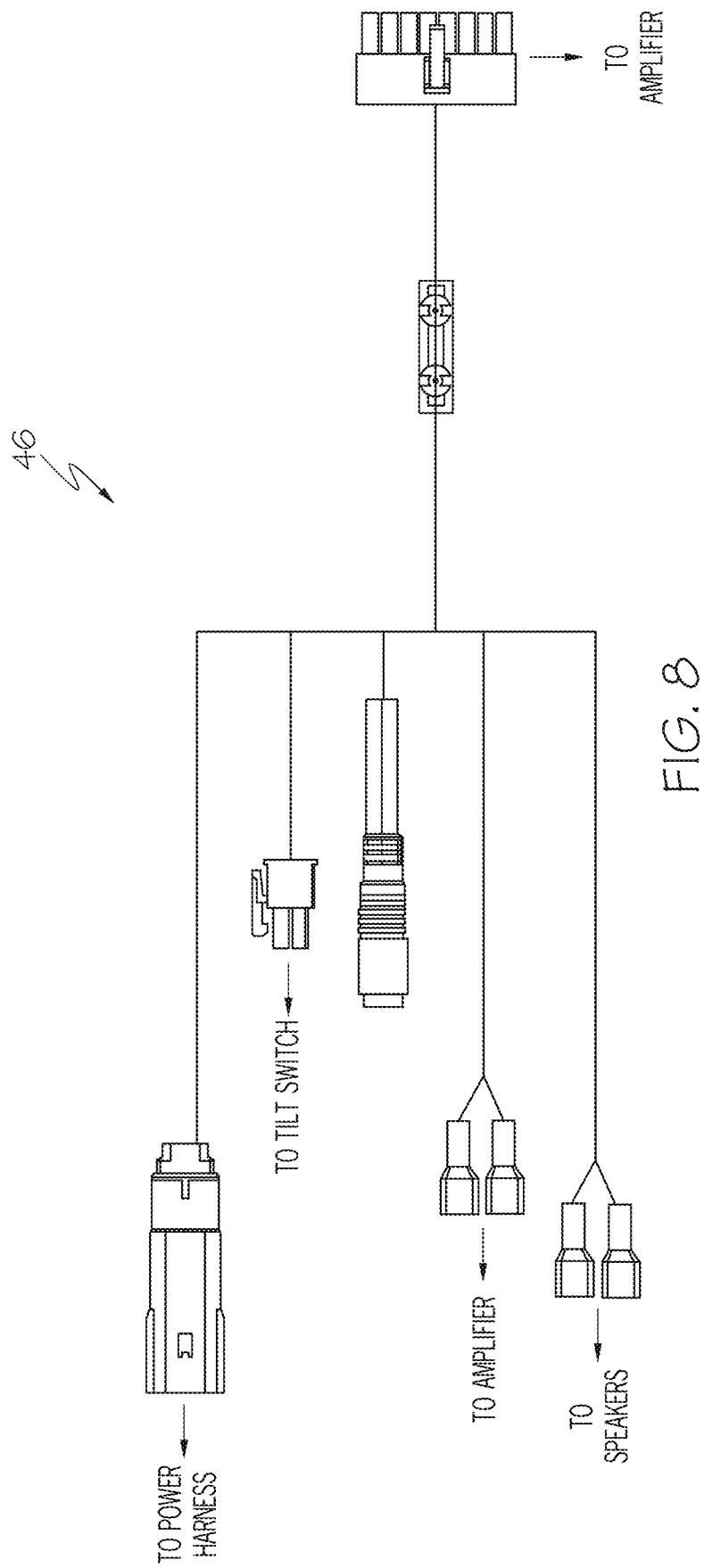
FIG. 8 is a schematic illustration of the amplifier harness.
Figure 9:
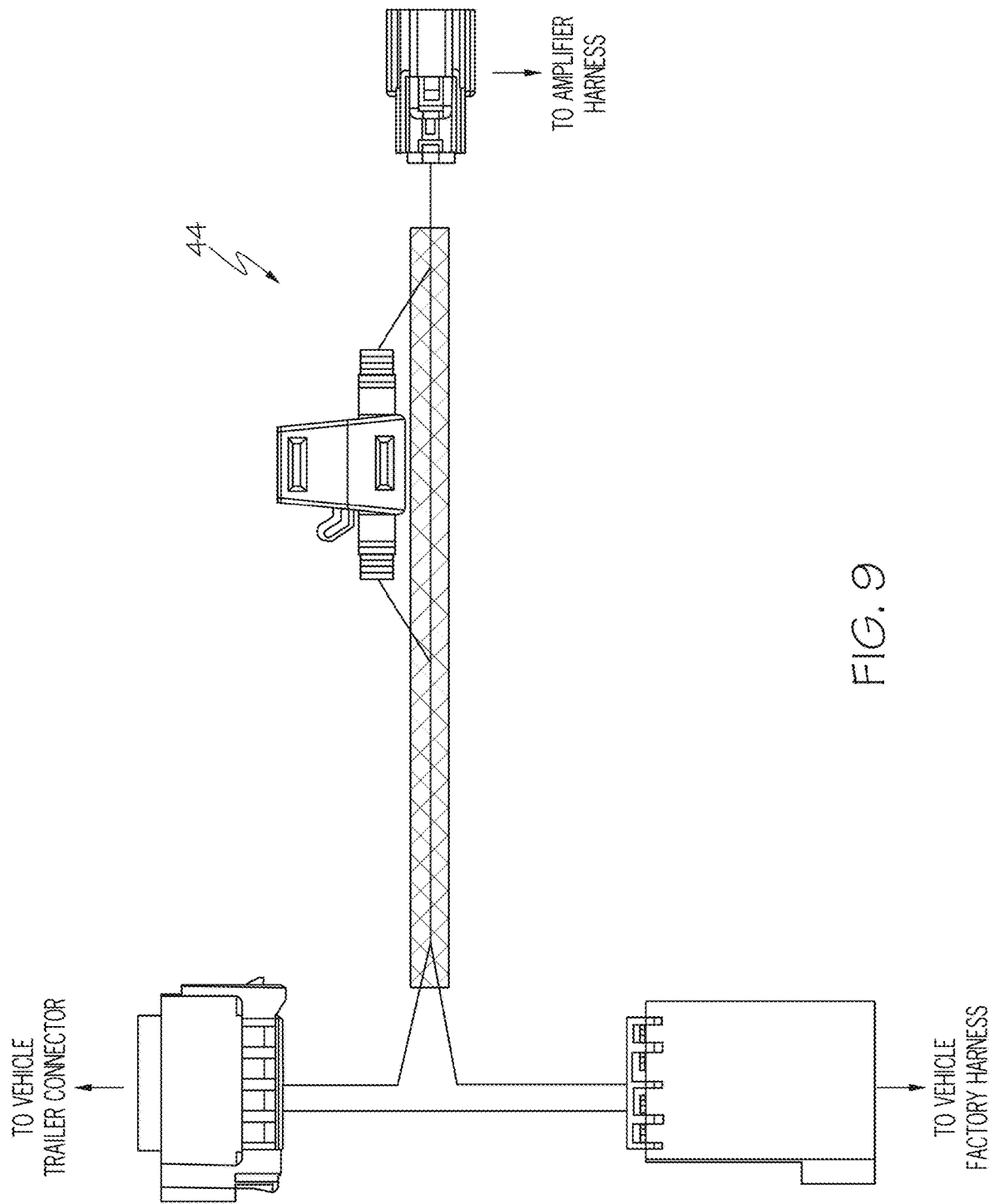
FIG. 9 is a schematic illustration of the power harness.

The electrical connections may be accomplished by a wiring assembly 42 (FIGS. 6-9) for electrically integrating the audio system 10 into the electrical system of the pickup truck. The wiring assembly 42 may comprise an amplifier harness 44 (FIGS. 6&8) for electrically connecting the amplifier 38 to the at least one loudspeakers 24 and 26. Additionally, the wiring assembly 24 may include a power harness 46 (FIGS. 6&9) for electrically connecting the amplifier 38 to the vehicle's electrical system, such as the 12-volt battery 48 (FIGS. 6&9) and to the power switch discussed below.

Referring still to FIGS. 5-7, the system 10 may include an amplifier controller 50 operatively connectable to the amplifier 38. The controller unit 50 may be mounted in the mounting panel 30. The amplifier and power harnesses 44 and 46 of the wiring assembly 42 provide the electrical connections between the vehicle's electrical system and the components of the system 10.

Because the inventive system 10 is designed to draw power from the vehicle's battery 48 (FIG. 7), minimizing power consumption is advantageous. In the embodiment illustrated, the inventive system is a 100-watt audio system. Although the inventive system is integrated into a tailgate, it may operate independently of the sound system inside the vehicle. In this embodiment, the vehicle engine does not need to be running for the system 10 to function, and a low current draw allows it to play for hours without depleting the battery.

Figure 2:
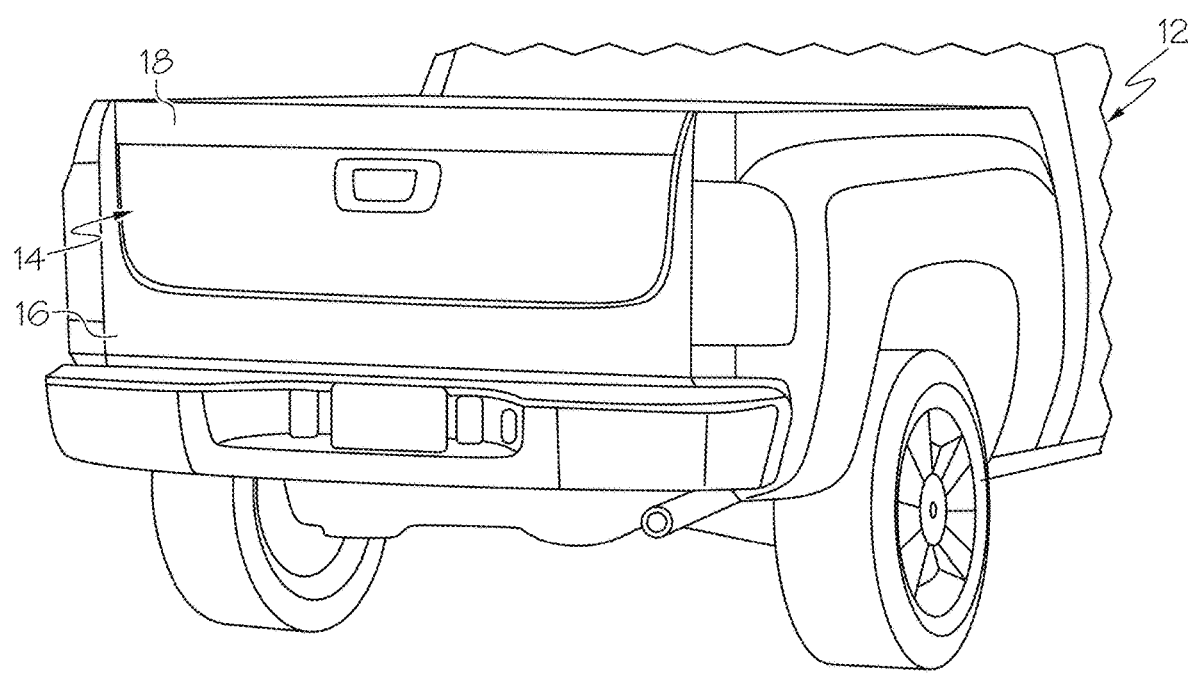
FIG. 2 shows a perspective view of the tailgate in the closed position.

As illustrated, when the tailgate 14 is closed, the audio system 10 is concealed. To ensure that the system 10 is powered on only when the tailgate 14 is in the fully open configuration, the system may include a power switch 54 (FIGS. 6&7). The power switch 54 may be configured to detect the position of the tailgate 14 and to depower the system 10 when the tailgate is in the closed position, that is, to automatically power down the system once the inner tailgate 18 and step panel 20 are folded shut and the primary tailgate 16 is closed, as seen in FIG. 2. Still further, the power switch 54 may be configured to power on the system 10 only when the tailgate 14 is in the fully open position, as seen in FIGS. 1 and 5.

The power switch 54 may be an inclination sensor, an altitude switch, an accelerometer, a mercury switch, or a tilt switch (ball or mercury). In the embodiment shown herein, the power switch 54 is a ball type tilt switch. The controller's circuitry may include a microcontroller or other circuitry for sensing the position of the tilt switch 54 and controlling activation of the audio system 10 in response thereto. The tilt switch 54 switches between an open position and a closed position based on the angular orientation of the switch and tailgate 14 to which it is attached. When the tilt switch 54 is in the open position, indicative of the tailgate 14 being in the closed position, electrical power is not supplied to the audio system 10. When the tilt switch 54 is in the closed position, indicative of the tailgate being in the down or open position, electrical power is supplied to the audio system 10.

In the kit 22, the tilt switch 54 is mountable to the amplifier bracket 40 (FIG. 6). One suitable tilt switch is Model DSA01 tilt switch from NKK Switches of America, Inc. (Scottsdale, Ariz.). This particular model is a mercury-free ball switch that is triggered when tilted beyond ±10° of the horizontal. The operating range is: ON Angle=10°~170°; OFF Angle=190°~350°.

Advantageously, the system may incorporate a USB port 60 (FIGS. 5-7) for device charging and flash memory playback, along with full Bluetooth streaming compatibility. The illuminated display puts the user in charge of the programming track, volume and source. Built-in buttons on the control panel may provide track and volume level control. The kit may include lights 62 and 64, as shown in FIG. 5). Alternately, if no lights are included, plugs 66 and 68 may be provided to cover the light openings. All these desirable features may be provided without comprising the strength and structural integrity and versatility of the vehicle's tailgate.

"Loudspeaker" and "speaker" are used synonymously herein and refer to a device that converts electric signals to audible sound and may be used interchangeably with the term "speaker." "Loudspeaker" includes devices dedicated to selected ranges, such as mid-range, tweeter, and sub-woofer. "Loudspeaker" is not limited to any particular design or mechanism of operation. For purposes of description herein, the terms "upper," "lower," "top," "bottom," "right," "left," "rear," "front," "vertical," "horizontal," and derivatives thereof shall relate to the audio system as oriented in FIG. 5. However, it is to be understood that the invention may assume various alternative orientations, except where expressly specified to the contrary. It is also to be understood that the specific devices and processes illustrated in the attached drawings and described in the following specification are simply exemplary embodiments of the invention. Hence, specific dimensions and other physical characteristics relating to the embodiment disclosed herein are not to be considered as limiting, unless the claims expressly state otherwise.

Unless otherwise stated explicitly, each element shown or described herein is optional. Many details are often found in the art and, therefore, many such details are neither shown nor described herein. It is not claimed that all of the details, parts, elements, or steps described and shown were invented herein. Even though numerous characteristics and advantages of the present invention have been described in the drawings and accompanying text, the description is illustrative only.

Changes may be made in the details, especially in matters of shape, size, and arrangement of the parts within the principles of the invention to the full extent indicated by the broad meaning of the terms of the attached claims. Unless otherwise expressly stated, each and every element described and shown herein is optional.

The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. An audio system for the tailgate of a vehicle, wherein the tailgate is movable between a closed position and an open position, wherein the tailgate comprises a primary tailgate movable between a vertical closed position and a horizontal open position and an inner tailgate movable between a closed horizontal position when the primary tailgate is in the open horizontal position and an open vertical position depending from the primary tailgate when the primary tailgate is in the open horizontal position, wherein the audio system is configured for installation in the inner tailgate, the audio the system comprising:
- at least one loudspeaker, wherein each of the at least one loudspeaker is configured for installation in the tailgate; and
- an amplifier electrically connectable to the loudspeaker;
- an amplifier controller operatively connectable to the amplifier; and
- a power switch configured to detect the position of the tailgate and to depower the system when the tailgate is in the closed position, wherein the power switch is configured to detect the position of the primary tailgate and the inner tailgate and to power on the system only when the primary tailgate is in the open horizontal position and the inner tailgate is in the open vertical position depending from the primary tailgate when the primary tailgate is in the open horizontal position.

2. The audio system of claim 1 wherein the at least one speaker comprises a pair of coaxial speakers.

3. The audio system of claim 1 wherein the power switch is of a type selected from the group consisting of an inclination sensor, an altitude switch, an accelerometer, a mercury switch, and a tilt switch.

4. The audio system of claim 3 wherein the power switch is a tilt switch.

5. The audio system of claim 4 wherein the tilt switch is a metal ball switch.

6. The audio system of claim 1 wherein the power switch is a tilt switch.

7. The audio system of claim 1 wherein the power switch further is configured to power on the system only when the tailgate is in the open position.

8. A kit for installing an audio system in the tailgate of a vehicle, the kit comprising:
- the audio system of claim 1;
- a mounting panel configured to attach to the tailgate, wherein the at least one loudspeaker is supportable in the mounting panel; and
- a wiring assembly for electrically integrating the audio system into the electrical system of the vehicle.

9. The kit of claim 8 wherein the amplifier controller is supportable in the mounting panel.

10. The kit of claim 8 wherein the wiring assembly includes:
- an amplifier harness for electrically connecting the amplifier to the at least one loudspeaker and to the power switch; and
- a power harness for electrically connecting the amplifier to the vehicle's electrical system.

11. The kit of claim 8 further comprising a bracket for supporting the amplifier in the tailgate behind the mounting panel.

12. A tailgate equipped with the audio system of claim 1.

13. A vehicle equipped with the tailgate of claim 12.

14. The vehicle of claim 13, wherein the vehicle is a pickup truck.

* * * * *

UNITED STATES PATENT AND TRADEMARK OFFICE
CERTIFICATE OF CORRECTION

| | |
|---|---|
| PATENT NO. | : 11,242,097 B1 |
| APPLICATION NO. | : 17/079814 |
| DATED | : February 8, 2022 |
| INVENTOR(S) | : Joseph C. Gross, IV et al. |

It is certified that error appears in the above-identified patent and that said Letters Patent is hereby corrected as shown below:

In the Specification

Column 1, Line 66: replace "1500" with --1500--.
Column 2, Line 4: replace "and secondary" with --and a secondary--.
Column 2, Line 19: replace "in vertical" with --in the vertical--.
Column 2, Line 24: replace "invention in" with --invention is--.
Column 2, Line 40: replace "such as a" with --such as--.
Column 2, Line 49: replace "1500" with --1500--.
Column 4, Line 13: replace "comprising" with --compromising--.

Signed and Sealed this
Seventh Day of June, 2022

*Katherine Kelly Vidal*

Katherine Kelly Vidal
*Director of the United States Patent and Trademark Office*